United States Patent [19]
Davis

[11] 3,784,296
[45] Jan. 8, 1974

[54] CODING MEANS FOR PHOTOGRAPHIC SLIDE APPARATUS

[76] Inventor: Lon R. Davis, 11116 Cumpston St., North Hollywood, Calif. 91601

[22] Filed: June 19, 1972

[21] Appl. No.: 263,816

[52] U.S. Cl. .............................................. 353/120
[51] Int. Cl. ..................... G03b 21/11, G03b 23/04
[58] Field of Search ........................... 353/25–27, 353/120; 250/219 D 219 DC

[56] References Cited
UNITED STATES PATENTS

| | | | |
|---|---|---|---|
| 3,034,643 | 5/1962 | Keller | 250/219 D |
| 3,373,655 | 3/1968 | Nicholas | 353/120 |
| 3,519,832 | 7/1970 | Castaldi | 250/219 D |
| 3,553,437 | 1/1971 | Boothroyd | 250/219 D |

*Primary Examiner*—Louis R. Prince
*Assistant Examiner*—A. J. Mirabito
*Attorney*—Nilsson, Robbins, Wills & Berliner

[57] ABSTRACT

Coding means are disclosed for use in cooperation with photographic slides and an automatic projection apparatus, whereby specific slides can be identified for selection and projection. As disclosed in one form, the coding means comprises an adhesive tab that may be affixed either to an individual slide or to a slide magazine which carries a plurality of individual slides. The adhesive tab includes a flat base member, e.g., mylar film, with a reflective surface, carrying adhesive on one side for affixing the unit to a slide or magazine and also having adhesive on the opposed side to receive a plurality of non-reflecting sheet members for selective removal to provide reflective elements of a desired code pattern. In other exemplary forms as disclosed herein, the code elements are carried by a clamp-on metallic sheet for individual slides, and are printed on the slide magazine or molded therein during initial fabrication.

5 Claims, 5 Drawing Figures

PATENTED JAN 8 1974 3,784,296
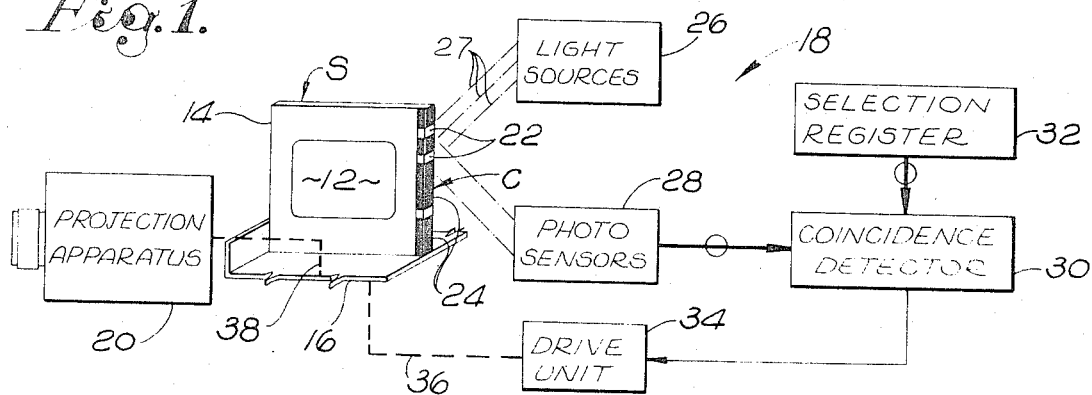
Fig. 1.
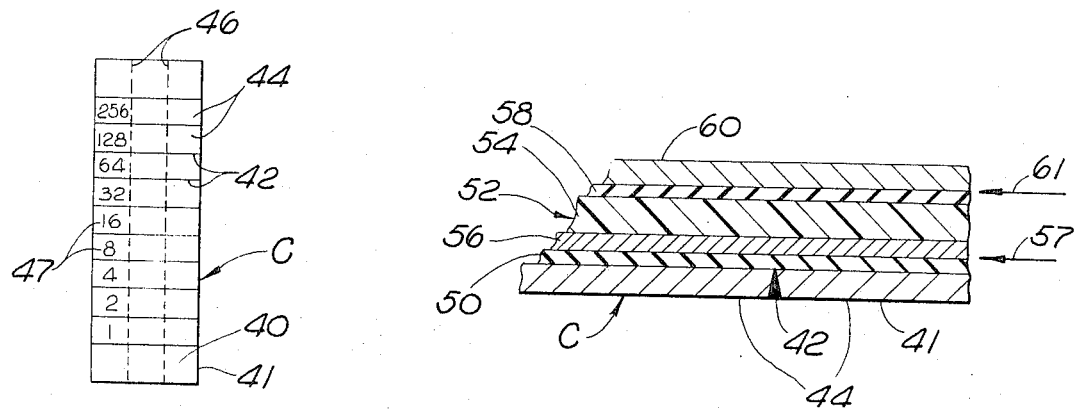
Fig. 2.
Fig. 3.
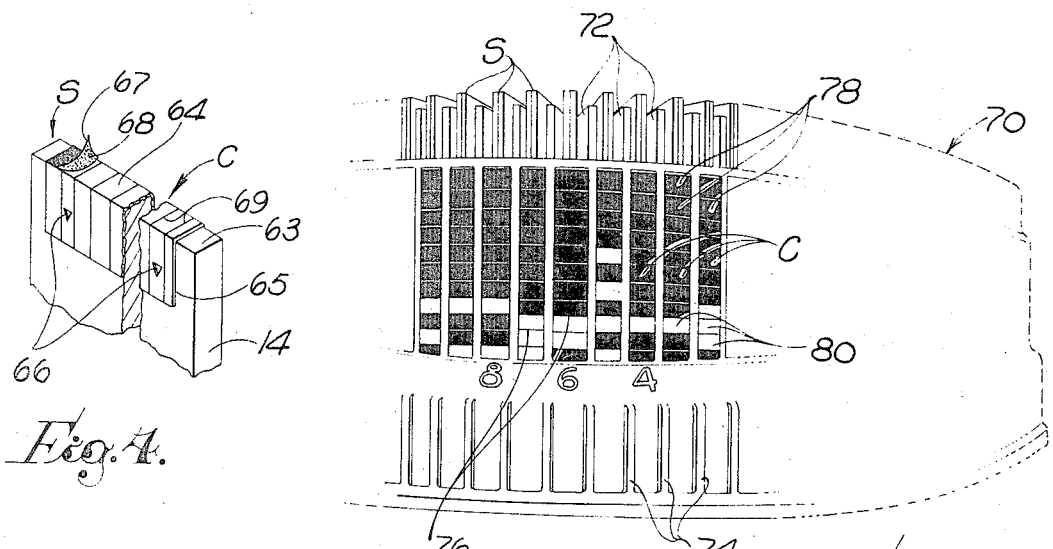
Fig. 4.
Fig. 5.

CODING MEANS FOR PHOTOGRAPHIC SLIDE APPARATUS

BACKGROUND AND SUMMARY OF THE INVENTION

Photographic slides have been popularized as an effective method for recording a memorable or otherwise significant scene. Generally, the slides include a small section of photographic film (bearing a transparency of the scene) supported in a frame, as of paperboard. Various projectors for exhibiting photographic slides are well known and some have been automated to a relatively-high degree. For example, one form of projecton apparatus incorporates a magazine and each time that a control button is depressed, the apparatus is actuated to display the next slide in the sequence arrangement of the magazine. Although such structures are very convenient for exhibiting a predetermined sequence of photographic slides, situations frequently arise in which it is desired to exhibit slides in several different orders or sequences. That is, it may be desirable to project a series of slides in one particular order or sequence during one exhibit, and to use an entirely different order during another exhibit. Consequently, a need exists for an effective apparatus that may be employed to identify each slide in a group so that they may be individually addressed for display in any desired random sequence.

Systems for selectively addressing specific locations in a magazine or the like have been previously proposed. For example, U.S. Pats. No. 3,225,652 (Sauppe) and 3,344,707 (Jullien-Davin) disclose systems for variously positioning a magazine or the like, so as to selectively provide access to a desired item, e.g., a photographic slide, as for exhibition. Although such systems have been proposed, a need has remained for simple, effective and economical coding means for identifying specific slides. That is, a need is deemed to exist for a simple structure that may be employed to identify specific slides (as in a magazine) for use in cooperation with a selection and exhibition system and whereby individual slides may be exhibited in a random display pattern that is either predetermined or determined slide-by-slide.

In general, the present invention comprises a coding structure as may be affixed either to individual photographic slides or to a magazine for a multiplicity of slides, so as to identify individual slides as for use in an automatic selection system. As disclosed, the structures for use on individual slides enable the provision of binary code patterns of light reflecting and non-reflecting areas. Additionally, as disclosed herein, a coding structure may be embodied in a magazine for slides, as on a panel adjacent a location containing a slide that is to be identified.

BRIEF DESCRIPTION OF THE DRAWINGS

In the drawings, which constitute a part of this specification, an exemplary embodiment exhibiting various objectives and features hereof is set forth as follows:

FIG. 1 is a block and perspective diagram of a system utilizing an apparatus of the present invention;

FIG. 2 is a plan view of one apparatus constructed in accordance with the present invention;

FIG. 3 is a fragmentary sectional view taken through the structure of FIG. 2;

FIG. 4 is a perspective view of an alternative form of structure embodying the present invention; and FIG. 5 is a perspective and diagrammatic view of another alternative form of structure embodying the present invention.

DETAILED DESCRIPTION OF THE ILLUSTRATIVE EMBODIMENTS

As required, detailed illustrative embodiments of the invention are disclosed herein. The embodiments exemplify the invention which may, of course, be embodied in other forms as well, some of which may be radically different from the illustrative embodiments as disclosed. However, the specific structural and functional details disclosed herein are representative and they provide a basis for the claims which define the scope of the present invention.

Referring initially to FIG. 1, there is shown a photographic slide S bearing a coding means C in accordance herewith. Generally, the slide S includes a photographic color transparency 12 mounted in a frame 14, which may be of paperboard. As illustrated, the single slide S exemplifies a plurality of slides which are carried in stacked-alignment by a magazine 16, as well known, and which is somewhat symbolically represented. Generally, the coding means C identifies the slide S to a selection system 18 (generally indicated) to selectively position the magazine 16 so that a projection apparatus 20 then operates to exhibit the identified slide. Essentially, the coding means defines light-reflecting areas 22 and non-light-reflecting areas 24. These areas define the elements of a binary code to specifically identify the slide S by the operation of the selection system 18.

A set of light sources 26 provide a series of light beams (represented by lines 27) and coincide in number to the number of areas 22 and 24 on the slide S. Certain of the beams (depending upon the code) are reflected by the coding means C to be sensed by a set 28 of photosensors, which provide a set of individual electrical signals manifesting the binary code defined by the areas 22 and 24. Thus, the photosensors 28 provide a set of electrical signals to a coincidence detector 30 in the form of a binary code that is indicative of a slide S currently illuminated by the set 26 of light sources.

The coincidence detector 30 also receives a set of digital binary signals from a selection register 32, that have a format similar to the signals from the photosensors 28. Functionally, the coincidence detector 30 provides a command signal to a drive unit 34 for motivating the magazine 16 unless and until coincidence occurs between the two groups of binary signals received from the photosensors 38 and the selection register 32. At the instant when the code signals from the sensors 28 coincide to the signals from the selection register 32, the coincidence detector 30 nulls and the drive unit 34 is halted to result in the display of the selected slide. In that manner the system addresses any desired photographic slide S. Of course, as well known in the prior art, various specific structural components may be employed in the exemplary system illustrated in FIG. 1. For example, the selection register 32 may receive a series of binary signal sets in sequence or, alternatively, may incorporate a keyboard for manual, individual selection of a desired slide S. In either case, upon the detection of coincidence, the drive unit 34 (coupled to the magazine 16 as indicated by a dashed line 36) stops the magazine 16 at which time the projection apparatus 20 (coupled to the magazine 16 as indicated by a dashed line 38) exhibits the selected slide S.

Considering the coding means C in somewhat greater detail it is readily apparent that many different structural forms may be employed. In that regard, as indicated above, exemplary forms are disclosed herein as somewhat representative. Of course, generally, the structure involves elements for simply and easily providing light codes to identify slides by digital values. Considering a first specific embodiment, reference will now be made to FIGS. 2 and 3.

The exposed surface 40 of the coding member, plate or means C is shown in FIG. 2 prior to the coding operations and the application of the means C to a slide S. Specifically, the surface 40 comprises a coding sheet 41 of non-reflecting material, e.g., black paper or the like, substantially covering one face or side of the coding plate or means C (also in sheet form). Perforation lines 42 in the sheet 41 define discrete sections or areas 44 of the sheet 41 which may be removed individually. In accordance with a specific code, by the selective removal of individual sections 44 (of equal size) a binary code identification is accomplished. Of course, any of a variety of binary code formats may be utilized as very well known in the prior art, many of which are in widespread practice. For example, the following code may be employed:

| | |
|---|---|
| 1 | 000000001 |
| 2 | 000000010 |
| 3 | 000000011 |
| 4 | 000000100 |
| 5 | 000000101 |
| 6 | 000000110 |
| 7 | 000000111 |
| 8 | 000001000 | pursuing the above example, indicia 47 on each of the sectioned areas 44 designate the numerical value that is accomplished by removing that specific area. Accordingly, the desired number for a slide is provided by selectvely removing areas 44, the number indicia 47 of which total the desired number.

It is also to be noted that the coding means C defines a pair of fold lines 46 extending in spaced-apart parallel relationship the full length of the coding means C. These lines serve to define folds for the placement of the means C on the edge of slide S as depicted in FIG. 1.

Considering the structure of the coding means C in somewhat greater detail, the sheet 41 is represented fragmentarily in section in FIG. 3 (bottom) with a perforation line 42 and areas 44 as indicated. The sheet 41 is backed by an adhesive layer 50 which is supported on a base member 52 including a film 54, e.g., mylar, metallized by a coating 56. The adhesive layer 50 tends to remain upon areas or sections 44 of the sheet 41, rather than upon the base member 52 as indicated by a parting-line arrow 57.

The opposed side (upper) of the base member 52 carries an adhesive layer 58 which affixes a release sheet 60. Again, as well known in the prior art, the release sheet 60 upon withdrawal from the composite leaves the adhesive layer 58 intact on the member 52. The parting line between the release sheet 60 and the adhesive layer 58 is indicated by an arrow 61.

Considering an exemplary use of the coding means C, a determination is first made of the arbitrary number to be assigned to the slide S upon which the coding means C is to be affixed. Thereafter, the sections 44 having indicated numerical values (indicia 47) to total the desired assigned number for the slide are then removed. For example, to designate a slide with the number "62" for example, the sections 44 bearing the indiciated numerals "32", "16", "8", "4" and "2" would be selected. Each of those sections 44 (involved in that cumulative total) are then simply removed from the composite coding means C. Thereafter, the coding means C is applied to the edge of a slide S (FIG. 1) with ninety degree angles formed at the score lines 46 to accommodate edge mounting. Subsequently, in use, the slide S is selected by the fact that light beams indicative of the assigned binary code of the slide S are reflected to be sensed, as by photosensitive devices.

Considering an alternative structure (of which there are many) to that described with reference to FIGS. 2 and 3, reference will now be made to FIG. 4. A slide S is fragmentarily illustrated including the frame 14 defining an edge 63. A coding plate or means C in accordance herewith is affixed to wrap about the edge 63. The means C includes a U-shaped, reflective metallic member defining a coding panel 64 integral with perpendicular sides 65. The means C is locked to the slide S as a result of points 66 (cut from the sides 65) which extend into the frame 14. Coding of the means C is accomplished by applied tabs 67 of non-reflective sheet (e.g., black tape) which carry an adhesive layer 68 for engagement with the coding panel 64.

The coding plate or means C of FIG. 4 may be produced from sheet aluminum, for example and may be stamp cut and shaped to define the panel 64 and the sides 65, as well as to punch the points 66 from the sides 65. The panel 64 is then scored by lines 69 to define the coding areas 22 (FIG. 1) which are simply exposed surfaces of the metallic sheet.

In using the coding means of FIG. 4, a slide S is placed so that the edge 63 abuts the inside surface of the panel 64, then the sides 65 are forcibly pushed toward the frame 14 so that the points 66 enter the frame and the metal is formed to mate with the frame 14. The tabs 67 may then be applied to cover selected spaces defined by the lines 69 to accomplish the desired code.

The composite or coding means C as described above, may be variously applied to identify a slide S other than at the edge of the frame 14 as described above. Also, the coding means C may be applied to a magazine so as to indicate slide locations therein which in turn identify a specific slide. Considering a specific example, reference will now be made to FIG. 5.

A rotary slide tray or magazine 70 is illustrated, as exemplary, various forms of which are well known in the prior art. Essentially, the magazine 70 defines open slots 72 for receiving individual slides S, as indicated. The cylindrical face of the magazine 70 defines a plurality of radially extending spaced-apart ridges 74 elongate flat surfaces 76 therebetween. In one form hereof, the coding means C as described above with reference to FIGS. 2 and 3 is provided in a sandwich composite and of a size to fit within the space of the surfaces 76 of the magazine 70. Coding means C are then encoded as described above, to indicate each position in the magazine 70. Normally, as a matter of convenience, the coding means will then be placed over the surfaces 76, in a numerical sequence coinciding to other indications on the magazine. Thus, the coding means C on the surfaces 76 provide first areas 78 which are not light reflecting and second areas 80 which are light reflecting. Consequently, the structure is adapted for use in a random selection system as described above.

As an alternative to accomplishing the areas 78 and 80 by use of the coding means C as described above, the magazine 70 may have the areas 78 and 80 provided by elements which are printed on the surfaces 76, molded or otherwise applied thereto. That is, the magazine 70 is provided to define relatively flat surfaces, each of which is associated with a specific slide location in the magazine. Such flat surfaces, e.g., surfaces 76, are then divided into a plurality of areas, e.g., areas 76 and 80, of substantially equal size which are binary coded as either light reflective or not light reflective. The magazine may then be selectively controlled by the reflection of applied light, to identify a specific location and, accordingly, identify a specific slide. Of course, within the conceptual confines of the above description, it is readily apparent that various forms of the present invention may be manufactured and effectively employed. Accordingly, the scope thereof is deemed to be in accordance with the claims as set forth below.

What is claimed is:

1. A coding means for photographic slide means to identify said slide means by a photoelectric sensing system, comprising:

an elongated base member of film material defining one surface having a first light-reflective characteristic, an elongated coding sheet having a light-reflective characteristic different from said first, affixed to said one surface of said base member, said coding sheet being perforated to define a multiplicity of sections for select removal from said base member to provide a light-indicative code; and fixing means for fixing said coding means to a photographic slide, including a layer of adhesive disposed on the other surface of said base member.

2. A photographic slide means including an image-bearing film, a mounting frame supporting said image-bearing film, and a coding means as defined by claim 1 affixed to said mounting frame.

3. A photographic slide according to claim 2 wherein said mounting frame is substantially rectangular defining four edges, and said coding means is affixed on one of said edges.

4. A photographic slide means including a slide magazine for supporting a plurality of individual slides in storage locations and further including coding means in accordance with claim 1 affixed to said magazine to identify each of said locations.

5. A coding means according to claim 1 wherein said coding sheet carries indicia to indicate a numerical value for said multiplicity of sections.

* * * * *